United States Patent [19]

Algra et al.

[11] Patent Number: 4,965,506
[45] Date of Patent: Oct. 23, 1990

[54] POWER-SUPPLY CIRCUIT HAVING CIRCUITRY FOR SWITCHING FROM A BATTERY CHARGING MODE TO A BATTERY TRICKLE-CHARGING MODE

[75] Inventors: Johannes E. Algra; Gerrit Brouwer, both of Drachten, Netherlands

[73] Assignee: U.S. Philips Corporation, New York, N.Y.

[21] Appl. No.: 412,075

[22] Filed: Sep. 25, 1989

[30] Foreign Application Priority Data

Feb. 14, 1989 [NL] Netherlands .................. 8900360

[51] Int. Cl.$^5$ .............................................. H02J 7/10
[52] U.S. Cl. ......................................... 320/23; 320/32; 320/39; 363/19
[58] Field of Search ..................... 363/19, 21; 320/18, 320/19, 21, 22, 32, 39, 40, 23

[56] References Cited

U.S. PATENT DOCUMENTS

| | | | |
|---|---|---|---|
| 4,504,775 | 3/1985 | Becker | 320/32 |
| 4,523,139 | 6/1985 | Schwarz et al. | 363/21 |
| 4,652,984 | 3/1987 | van der Akker et al. | 363/19 |
| 4,684,871 | 8/1987 | Plagge | 363/19 |
| 4,763,061 | 8/1988 | Schwarz | 363/19 |

Primary Examiner—William H. Beha, Jr.
Attorney, Agent, or Firm—Edward W. Goodman

[57] ABSTRACT

A self-oscillating power-supply circuit includes between two power-supply terminals (1, 2), the series arrangement of the primary winding (n1) of a transformer, a first transistor (T1), a first resistor (R1), and a second series arrangement of the secondary winding (n2) and a first diode (D1), with terminals (2, 4) for the connection of a battery (B) and, via a switch (S1), a motor (M). The secondary winding (n2) is connected to the base of the first transistor (T1) via the series arrangement of a second resistor (R2), a first capacitor (C1) and a third resistor (R3), a first zener diode (D2) being arranged between the third resistor (R3) and the first resistor (R1). The ends of the first resistor (R1) are coupled to the inputs (16, 17) of a switching amplifier (15) for turning off the first transistor (T1) at a specific voltage across the first resistor (R1). In order to achieve change-over from a normal charging current to a trickle-charging current at a specific battery voltage and in order to power the motor (M) with a constant voltage which is independent of the load, the circuit further has a switching device including the series arrangement of a fourth resistor (R4), a second transistor (T2) and a fifth resistor (R5), the base of the second transistor (T2) being coupled to the node (6) between the first capacitor (C1) and the second resistor (R2), to which a second diode (D3) is arranged in parallel.

36 Claims, 5 Drawing Sheets

POWER-SUPPLY CIRCUIT HAVING CIRCUITRY FOR SWITCHING FROM A BATTERY CHARGING MODE TO A BATTERY TRICKLE-CHARGING MODE

BACKGROUND OF THE INVENTION

1. Field of the Invention

The invention relates to a power-supply circuit for charging a battery with a charging current, comprising, between a first and a second power supply terminal, a first series arrangement of a primary winding of a transformer, a first transistor switch having a control input, a first resistor, and a second series arrangement of a secondary winding of the transformer and a first diode, the second series arrangement comprising terminals for the connection of a battery, a positive-feedback path between the node of the secondary winding and the first diode and the control input of the first transistor switch comprising the series arrangement of a second resistor and a first capacitor, the terminal of the first capacitor which is remote from the second resistor being coupled to the cathode of a zener diode, first switching means for turning off the first transistor switch at a specific voltage across the first resistor, the first switching means comprising a first input coupled to that end of the first resistor which is nearest the first transistor switch, a second input coupled to that end of the first resistor remote from the first transistor switch, and an output which is coupled to the control input of the first transistor switch, and second switching means for changing over from the charging current to a trickle-charging current above a specific threshold voltage.

Such a circuit can be employed for charging a battery and/or powering a load with an input voltage which may be either a rectified alternating voltage or a direct voltage. In particular, such a circuit is suitable for use in a shaver for charging the battery and/or powering the motor.

2. Description of the Related Art

A power supply circuit of the type defined in the opening paragraph is known from European Patent Application No. 0,226,253. In this circuit a current flows through the primary winding during the so-called forward interval, as a result of which energy is stored in the transformer. The primary current is converted into a voltage across a resistor. When a specific value of this voltage is reached, the first switching means turn off the first transistor switch, causing the primary current to be interrupted. The stored energy is then supplied to the battery as a linearly decreasing charging current via the secondary winding and the first diode during the so-called flyback interval. After the flyback the next forward interval is started by the positive feedback between the secondary winding and the control input of the first switch. In this way the battery can be charged comparatively rapidly with a comparatively large current.

In order to prevent the battery from being damaged by overcharging, the known power supply circuit comprises second switching means which turns off the power supply circuit via the first switching means if the battery voltage exceeds a threshold value and which subsequently renders the circuit operative at the instant at which the battery voltage has dropped below a specific second value. As a result of this, the circuit is switched from charging to trickle charging when the threshold value is exceeded first time.

However, the second switching means in the prior art power supply circuit comprises a comparatively large number of components, which renders the circuit more susceptible to component tolerances.

SUMMARY OF THE INVENTION

Therefore, it is an object of the invention to provide a power supply circuit comprising simple switching means for changing over to a trickle charging mode. In accordance with the invention, a power-supply circuit of the type defined in the opening paragraph is characterized in that the anode of the zener diode is coupled to one end of the first resistor, and in that the second switching means comprise a series arrangement of a third resistor, a second transistor switch having a control input, and a fourth resistor, arranged between the first input of the first switching means and the second power supply terminal, the control input of the second transistor switch being coupled to the node between the second resistor and the first capacitor, a third diode being arranged in parallel with the second resistor. The additional components required in the circuit for the second switching means comprise only three resistors and one transistor, which makes the power-supply circuit in accordance with the invention simple to realize. The voltage which appears across the capacitor during the flyback and which is proportional to the battery voltage at the end of the flyback turns on the second transistor switch at the end of the flyback. In the case of a fully charged battery, the fraction of the battery voltage appearing across the third resistor is large enough to energize the first switching means and consequently inhibit the next forward interval until the voltage across the first capacitor has decreased to such a value that the voltage across the third resistor is no longer adequate to keep the first switching means energized. In this way a number of forward intervals are inhibited after a flyback, causing the average charging current to decrease and causing the circuit to be changed over from the normal charging mode to a trickle charging mode.

The voltage at which the change-over from normal charging to trickle-charging is effected can be selected in such a way that it is equal to the motor-voltage of a motor which can be connected in parallel with the battery by means of a switch. The power-supply circuit then constitutes a constant-voltage source which, depending on the motor load, is capable of supplying a current varying from the trickle-charging current to the normal charging current. The circuit in accordance with the invention responds very rapidly to load changes, so that the motor speed remains constant and load-independent.

A first embodiment of a power-supply circuit in accordance with the invention may be characterized in that a series arrangement of a fifth and a sixth resistor is arranged between the second input of the first switching means and the node between the second resistor and the first capacitor, the control input of the second transistor switch being connected to the node between the fifth and the sixth resistor, the fifth resistor being suitably a variable resistor. The voltage at which the second transistor switch is turned on can be defined accurately by means of the fifth and the sixth resistor.

A second embodiment of a power-supply circuit in accordance with the invention is characterized in that the fourth resistor is formed by the series arrangement of two resistors, whose interconnecting node is coupled, via a seventh resistor, to a control input for receiving a control signal for increasing the voltage at which the change-over from the normal charging current to the trickle-charging current is effected. This enables a discharged battery to be rapidly recharged. This embodiment may be characterized further in that, in order to increase the turn-off voltage, the seventh resistor is coupled to the positive battery terminal, or in accordance with another embodiment in that the node between the two resistors is connected to the base of a third transistor, which has its collector and emitter coupled to those ends of the two resistors which are remote from the node, and in that, in order to increase the turn-off voltage, the seventh resistor is coupled to the base of the third transistor.

A third embodiment of a power-supply circuit in accordance with the invention is characterized in that the second input of the switching amplifier is coupled to that end of the first resistor which is remote from the first transistor switch by means of a voltage source for supplying a reference voltage which decreases as the input voltage increases. These steps prevent the output current of the power supply circuit from increasing when the input voltage increases as a result of the increasing switching frequency.

A fourth embodiment of a power-supply circuit in accordance with the invention is characterized in that the first switching means comprises a fifth transistor having its emitter connected to the first input, having its base connected to the second input and having its collector connected to the second power supply terminal by means of a series arrangement of an eleventh and a twelfth resistor, the node between the eleventh and the twelfth resistor being connected to the base of a sixth transistor, whose collector is coupled to the control input of the first transistor switch and, via a second capacitor, to the second input of the first switching means.

BRIEF DESCRIPTION OF THE DRAWINGS

The invention will now be described in more detail, by way of example, with reference to the accompanying drawings, in which.

DESCRIPTION OF THE PREFERRED EMBODIMENTS

Figure 1:
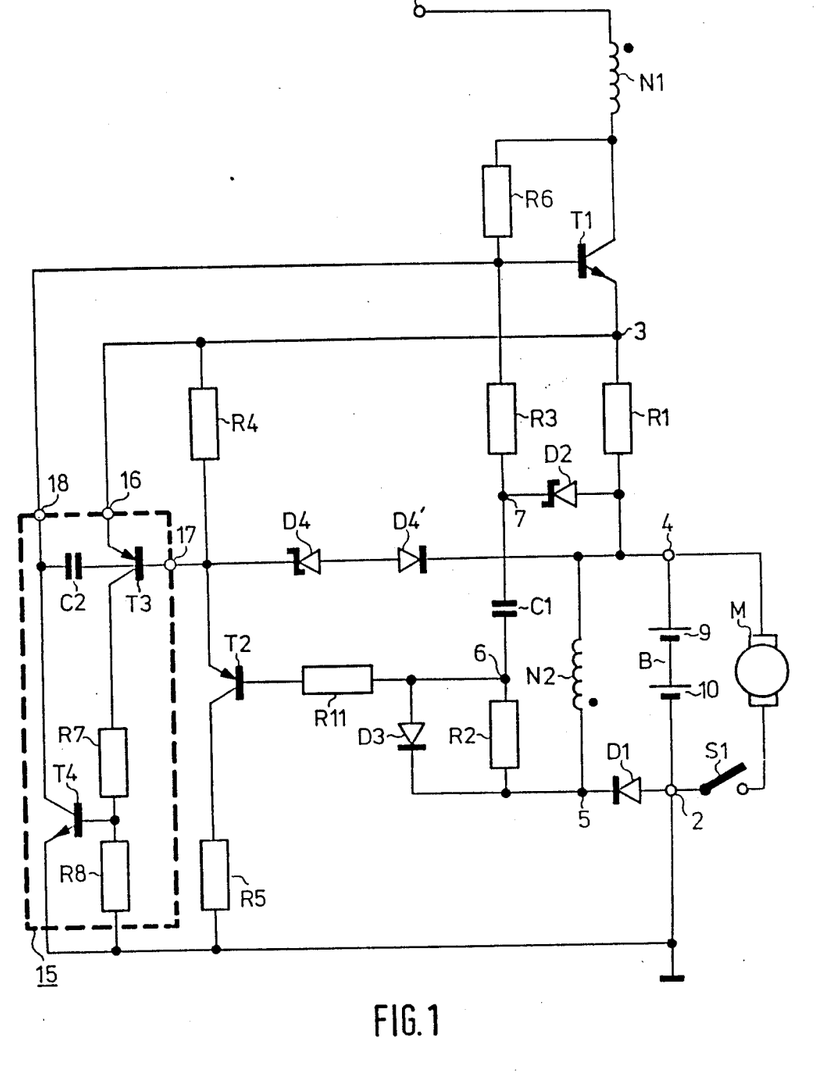
FIG. 1 shows a first embodiment of a power-supply circuit in accordance with the invention.

FIG. 1 shows the circuit diagram of a first embodiment of a power-supply circuit in accordance with the invention. The circuit comprises two input terminals 1 and 2 for receiving an input voltage, which may be a rectified alternating voltage or a direct voltage. Arranged between the terminals 1 and 2 is the series arrangement of the primary winding n1 of a transformer, the collector-emitter path of a transistor T1, a resistor R1 and the series arrangement of a secondary winding n2 and a rectifier diode D1. A battery B is connected between the terminals 4 and 2 and in the present case the battery is formed by the series arrangement of two nickel-cadmium cells 9 and 10. A motor M of, for example, a shaver can be connected in parallel with the battery B by means of a switch S1. The series arrangement of a resistor R2, a capacitor C1 and a resistor R3 is arranged between the node 5, between the secondary winding n2 and diode D1, and the base of the transistor T1. A zener diode D2 is arranged between the node 7, between the capacitor C1 and the resistor R3, and that end of the resistor R1 nearest the terminal 4. The base of the transistor T1 is connected to the collector of the transistor T1 by means of a starting resistor R6. It is to be noted that this resistor R6 may alternatively be connected to the input terminal 1. The ends 3 and 4 of the resistor R1 are connected to the inputs 16 and 17 of first switching means 15, which has an output 18 connected to the base of the transistor T1. In the present example, the switching means 15 comprises a transistor T3, having its emitter coupled to the input 16, having its base coupled to the input 17 and having its collector coupled to the second power-supply terminal 2, via the series arrangement of two resistors R7 and R8. The node between these two resistors R7 and R8 is coupled to the base of a transistor T4, having its emitter coupled to the second power-supply terminal and having its collector coupled both to the output 18 and, via a capacitor C2, to the input 17. The transistors T3 and T4 together with the resistors R7 and R8 and the capacitor C2 constitute a dynamic Schmitt-trigger circuit. The series arrangement of a resistor R4, the collector-emitter path of a transistor T2 and a resistor R5 is arranged between the first input 16 and the power-supply terminal 2. The transistor T2 has its base connected to the node 6 between the resistor R2 and the capacitor C1. A diode D3 is arranged in parallel with the resistor R2. The emitter of the transistor T2 is connected to the end 4 of the resistor R1 by means of a zener diode D4. A diode D4' is arranged in series with the zener diode D4, the two anodes or the cathodes facing one another.

The operation of the circuit can be explained as follows if, for the time being, the effect of the transistor T2, the resistor R5 and the diode D3 is ignored. It is assumed that the switch S1 is open and the circuit only supplies the charging current for the cells 9 and 10. When an input voltage is present across the terminals 1 and 2, a small current will flow into the base of the transistor T1 via the starting resistor R6, so that transistor T1 is driven partly into conduction. The resulting current through the primary winding n1 results in a voltage increase across the secondary winding n2, so that the transistor T1 is driven further into conduction as a result of the positive feedback via the resistor R2, the capacitor C1 and the resistor R3. As a result of the continuing positive feedback, the transistor T1 is rapidly saturated. The voltage across the secondary winding n2 is proportional to the voltage across the primary winding n1 and hence to the input voltage. The base current of the transistor T1 would therefore be independent of the input voltage. This would result in an increasing turn-off delay of the transistor T1 in the case of an increasing input voltage, which would lead to an undesirable increase of the charging current of the battery B. However, the base current of the transistor T1 produces such a voltage drop across the resistor R2 that the voltage on the node 7 reaches the breakdown voltage of the zener diode D2. As a result of this, the base current of the transistor T1 becomes independent of the input voltage, so that everytime the transistor T1 is saturated to the same extend and the turn-off delay is consequently independent of the input voltage. The value of the base current is defined by means of the resistor R3. Alternatively, the anode of the zener diode D2 may be coupled directly to the emitter of the first transistor T1. However, the configuration in FIG. 1 has the advantage that the base current for the transistor at the beginning of the forward interval is larger, so that the transistor T1 is turned on hard and the forward interval is started rapidly. Moreover, in the above configuration, the transistor T1 is driven less far into saturation at the end of the forward interval, so that this transistor T1 is cut off more rapidly.

After the transistor T1 is bottomed as described above, the current through the primary winding n1 increases as a linear function of time during the forward interval. During the forward interval the voltage on the node 5 is positive, so that the diode D1 is cut off. The primary current is converted into a voltage across the resistor R1, this voltage being applied to the series arrangement of the base-emitter junction of the transistor T3 and the zener diode D4. When the breakdown voltage of the zener diode D4 is reached, the voltage on the base 17 of the transistor T3 is maintained constant. As the primary current increases further, the voltage across the resistor R4 will increase until the threshold voltage of the transistor T3 is reached and the transistor T3 is turned on. The collector current of the transistor T3 drives the transistor T4 into conduction via the resistors R7 and R8, so that base current is withdrawn from the transistor T1. The voltage step appearing on the collector of the transistor T4 is transferred to the base of the transistor T3 via the capacitor C2, so that the transistor T3 is rapidly driven into full conduction. Consequently, the transistor T3 is turned on hard and the transistor T1 is cut off rapidly.

Since there is no primary current, the polarity of the voltage across the secondary winding n2 is reversed, so that the diode D1 is turned on. The energy stored in the transformer during the forward interval is then supplied to the battery B in the form of a charging current during the so-called flyback. This current decreases to zero as a linear function of time. During the flyback, the voltage on the end 5 of the secondary winding n2 is negative and equal to the voltage across the diode D1. At the end of the flyback, the voltage across the winding n2 becomes zero volts, so that the voltage on the node 5 becomes equal to the battery voltage. This positive voltage step on the node 5 ensures that after some time, the next forward interval is started time owing to the positive feedback via R2, C1 and R3.

In the manner described above, the cells 9 and 10 can be charged comparatively rapidly with a comparatively large current, for example a 2 C current of substantially 1.2 A in the case of two 1 C NiCd rechargeable cells of 1.2 V each.

In order to prevent the cells 9 and 10 from being damaged as a result of overcharging, the power-supply circuit is provided with very simple switching means, which effects the change-over from a normal charging current to a trickle-charging current as the cells are reaching the fully charged condition. This switching means comprises the transistor T2, the resistors R4, R5 and R11, the diode D3 together with the resistor R2, the capacitor C1 and the zener diode D2. The switching means operate as follows.

When the cells 9 and 10 are being charged, the voltage on the emitter of the transistor T3 is at least equal to the battery voltage during the forward interval. The voltage on the base of the transistor T2 is equal to the sum of the battery voltages, the breakdown voltage of the zener diode D2 and the voltage across the capacitor C1, whose terminal 6, which is situated nearest the terminal 5 of the winding n2 which is positive during the forward interval, is positive relative to the terminal 7. Therefore, the sum of the emitter-base voltages of the transistors T3 and T2 is negative, so that the transistor T2 is cut off during the forward interval. Since in this situation no current flows into the base of the transistor T2, there will be no voltage drop across R11. At the beginning of the flyback, the polarity of the voltage across the secondary winding n2 is reversed, so that the diode D1 is turned on and the voltage on the node 5 becomes equal to the negative supply voltage (ground) minus one diode voltage.

As a result of this, the capacitor C1 is re-charged via the zener diode D2 and the diode D3. The voltage on the node 6, which is coupled to the base of the transistor T2 via the resistor R11, is therefore zero volts. The voltage on the terminal 7 of the capacitor C1 is clamped at a value equal to the battery voltage minus one diode voltage by means of the zener diode D2, which is operated as a diode during the flyback. The voltage on the emitter 16 of the transistor T3 is equal to the battery voltage. The voltage difference between the emitter 16 of the transistor T3 and the node 6 is then equal to the battery voltage. The resistor R11 now functions as a current-limiting resistor for the base current of the transistor T2, so that the sum of the two base-emitter voltages cannot become too large. In particular at the beginning of the flyback, the voltage across the battery is substantially higher than the actual battery voltage as a result of the voltage produced across the internal resistance of the battery by the charging current. Under normal conditions the voltage across the base-emitter junctions of the transistors T2 and T3, at the beginning of the flyback, is therefore higher than two base-emitter voltages, so that the transistors T2 and T3 will conduct. As long as the transistor T2 draws enough current, the resistor R4 will maintain an adequate base-emitter voltage across the transistor T3 to keep this transistor T3 in the conductive state and, via the transistor T2, the switching transistor T1 in the cut-off state. This prevents the transistor T1 from being turned on again after turn-off.

In order to eliminate the influence of the internal resistance on the battery voltage, the detection whether the batteries have been charged adequately and it is necessary to change over to trickle charging is effected by detecting the battery voltage at the end of the flyback when the charging current is zero. At the end of the flyback, the voltage across the secondary winding n2 becomes zero volts and the voltage on the node 5 between the secondary winding and the diode D1 jumps from zero volts to the battery voltage. This voltage step is not followed immediately by the node 6 between the capacitor C1 and the resistor R2, so that the voltage on the base of the transistor T2 will not change immediately at the end of the flyback. Consequently, a voltage equal to the voltage across the capacitor C1 will appear between the emitter of the transistor T3 and the base of the transistor T2. During the flyback, the capacitor C1 has been charged to the battery voltage minus the voltage across the diode D2, so that the voltage across this capacitor C1 is proportional to the battery voltage. When the cells have been charged adequately, the voltage across the capacitor C1 will be so large that the transistors T2 and T3 conduct.

Since the zener diode D2 is operated as a diode and remains conductive, the voltage on that terminal of the capacitor C1 which is situated nearest the zener diode D2 remains equal to the difference between the battery voltage and the voltage across the zener diode D2. As long as the switching transistor T1 remains off, the node 5 will remain at the battery voltage. The terminal of the capacitor C1 nearest the node 5 then gradually adopts this voltage, the time constant being dictated by the RC time constant of the circuit comprising R2 and C1. As long as the voltage is sufficiently high, the transistors T2 and T3 remain conductive. As a result of this the transistor T1 remains cut off, thereby inhibiting the start of the next forward interval. The transistor T2 is then maintained in conduction to a suitable extent. If the slight voltage drop across the resistor R1 and the collector-emitter voltage across the transistor T2 are ignored, the voltage across the resistors R4 and R5 will be equal to the battery voltage. The transistor T3 then remains in the conductive state until the voltage across the capacitor C1 has decreased so far that the transistor T2 is cut off and the voltage across the resistor R4 becomes too small to maintain conduction of the transistor T3. The next forward interval can then be started. At least one base-emitter voltage remains available on C1, so that T1 is immediately driven into conduction at the beginning of the forward interval. Thus, when a specific battery voltage is reached and the cells have been charged adequately, a number of forward intervals are inhibited after every flyback interval, thereby reducing the average charging current. In this way it is possible to change over, for example, from an 1.2 A charging current to a 0.12 A trickle-charging current.

Figure 2A:
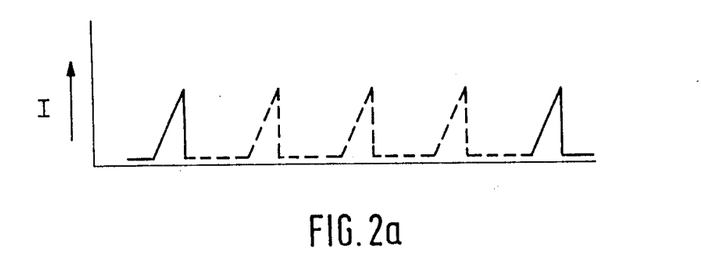
FIGS. 2a and 2b shows some characteristic curves to illustrate the operation of the circuit shown in FIG. 1.
Figure 2B:
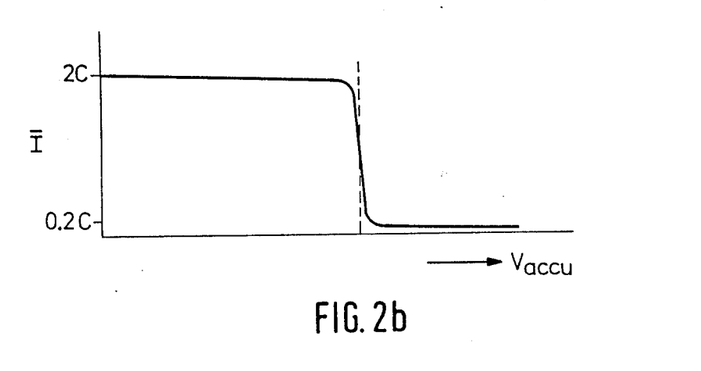

FIG. 2a shows diagrammatically the primary current in the trickle-charging mode, the suppressed forward intervals being indicated in broken lines. FIG. 2b shows diagrammatically the average charging current as a function of the battery voltage.

In the circuit arrangement shown in FIG. 1, the change-over point from the normal charging current to the trickle-charging current can be situated at any desired voltage, for example, the motor voltage. In that case the power-supply circuit will operate as a constant-voltage source when the switch S1 is closed, this source, depending on the load of the motor, being capable of supplying an output current ranging from the trickle-charging current to the normal charging current. This prevents the supply voltage of the motor and hence the speed of the motor from increasing as the load increases.

The circuit described herein exhibits a steep dependence between the delivered current and the voltage, so that in the case of a load variation of the motor, the current supplied to the motor varies rapidly between 0.12 A and 1.2 A and the motor speed remains constant.

Figure 3:
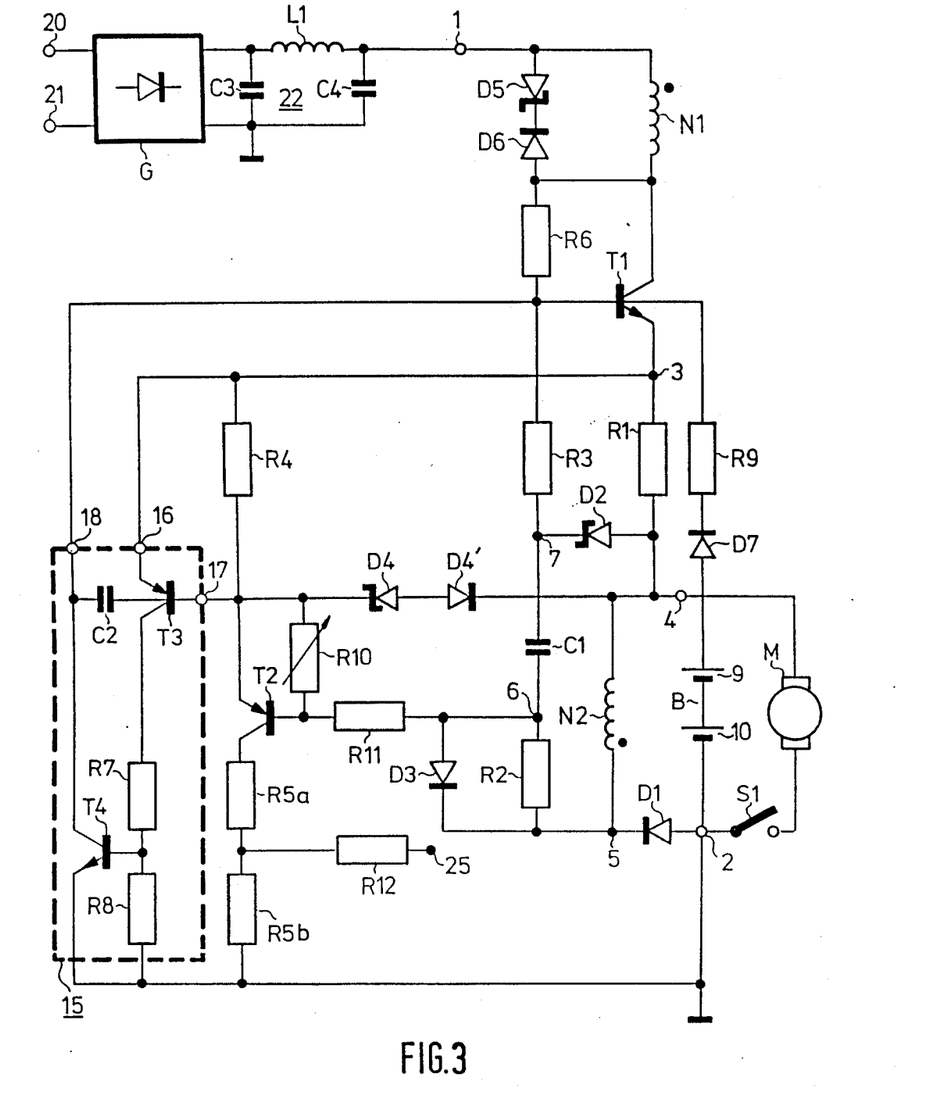
FIG. 3 shows a second embodiment of a power supply circuit in accordance with the invention.

FIG. 3 shows a second embodiment of a power-supply circuit in accordance with the invention. Identical parts bear the same reference numerals as in FIG. 1. In this embodiment the line voltage is applied to a bridge rectifier G via two terminals 20 and 21. The rectified voltage is smoothed by means of a filter 22 comprising a coil L1 and two capacitors C3 and C4 and is subsequently applied to an input terminal 1. The series arrangement of a zener diode D5 and diode D6 is arranged in parallel with the primary winding to suppress voltage surges when the current through the primary winding is switched off.

A voltage divider comprising the resistors R10 and R11 is arranged between the emitter and the base of the transistor T2, the resistor R10 being suitably a variable resistor. This voltage divider enables the voltage at which the transistor T2 is driven into conduction and hence the voltage at which the change-over from the normal charging current to the trickle-charging current is effected, to be adjusted accurately.

Moreover, the resistor R5 in the present embodiment is split into two resistors R5a and R5b, the node between these resistors being connected to a control input 25 by means of a resistor R12. When this input 25 is connected to the positive terminal of the battery, a fraction of the battery voltage, for example half this voltage, will appear across the resistor R12. When the transistor T2 is bottomed during the flyback, the voltage divider comprising the resistor R4 and the resistor R5a then ensures that again a fraction of the voltage across the resistor R12 appears across the resistor R4. By suitably dimensioning the resistors R4 and R5a, the transistor T3 can be turned on at a higher battery voltage than that at which the transistor T3 is turned on in the absence of a signal on the signal input 25. This changing over to the trickle-charging current is possible at a higher battery voltage than during normal use. This possibility can be utilized in order to recharge drained batteries very rapidly. Moreover, the present embodiment comprises a light-emitting diode D7 and a resistor R9 arranged in series between the positive terminal 4 of the battery and the base of the transistor T1. In the charging mode, the diode D7 will blink at such a frequency that it gives the impression of a continuously lit diode. The diode D7 thus functions as a battery charging indicator.

Figure 4:
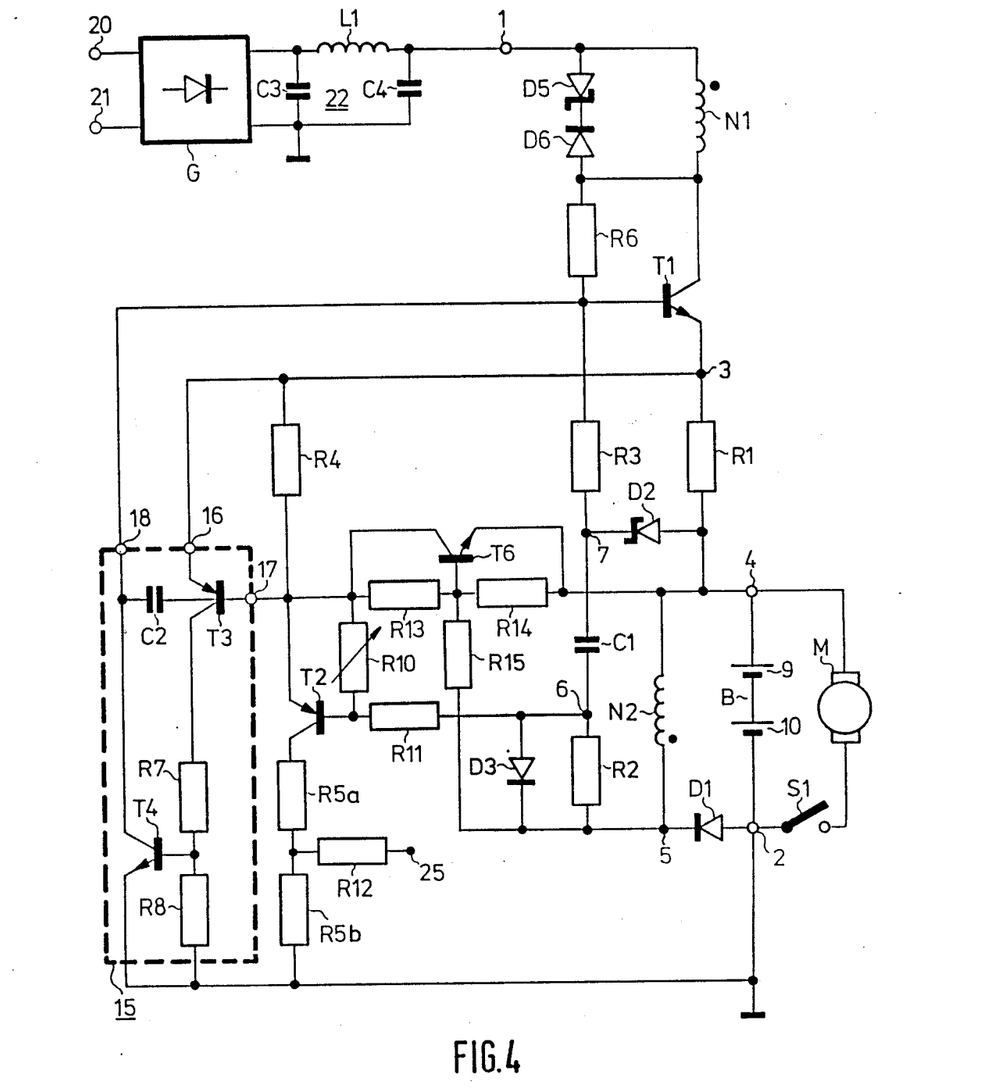
FIG. 4 shows a third embodiment of a power supply circuit in accordance with the invention.

FIG. 4 shows a third embodiment of a power-supply circuit in accordance with the invention, identical parts bearing the same reference numerals as in FIG. 3. The rate at which the primary current increases as a linear function of time during the forward interval is proportional to the input voltage. For an increasing input voltage, the primary current value at which the transistor T1 is turned off is therefore reached increasingly faster. This results in a higher switching frequency of the power supply circuit, as a result of which the average charging current increases when the input voltage increases. In order to maintain the charging current constant as far as possible when the input voltage increases, the circuit is provided with input voltage compensation. For this purpose the zener diode D4 of the circuit shown in FIG. 3 is replaced by a reference-voltage circuit, whose reference-voltage decreases as the input voltage increases. This reference-voltage circuit comprises a series arrangement of resistors R13 and R14, which is arranged between the emitter of the transistor T2 and the end 4 of the resistor R1 and whose interconnecting node is connected to the base of a transistor T6, having its collector connected to the resistor R13, having its emitter connected to the resistor R14, and having its base connected to the terminal 5 of the secondary winding n2 by means of a resistor R15. During the forward interval, a fraction of the voltage across the resistor R1 appears across the resistor R14 via the voltage divider R4, R13 and R14 and a fraction of the voltage across the secondary winding n2 appears across this resistor R14 via the voltage divider R15, R14. When the voltage across the resistor R14 reaches the threshold voltage of the transistor T6 this transistor is turned on. The collector-emitter voltage is then equal to the base-emitter voltage of the transistor T6 multiplied by a factor dictated by the resistance value of the resistors R13 and R14. This voltage does not increase any further as the voltage across the resistor R1 increases. When the input voltage increases, the voltage across the secondary winding n2 increases, causing the voltage across the resistor R14 to increase. In this way it is achieved that for an increasing input voltage, the voltage across the resistor R14 reaches the base emitter threshold voltage of the transistor T6 at decreasing values of the primary current, so that for an increasing input voltage, the transistor T1 is turned off at increasing values of the primary current. As a result of this, the average output current of the circuit becomes substantially independent of the input voltage.

Figure 5:
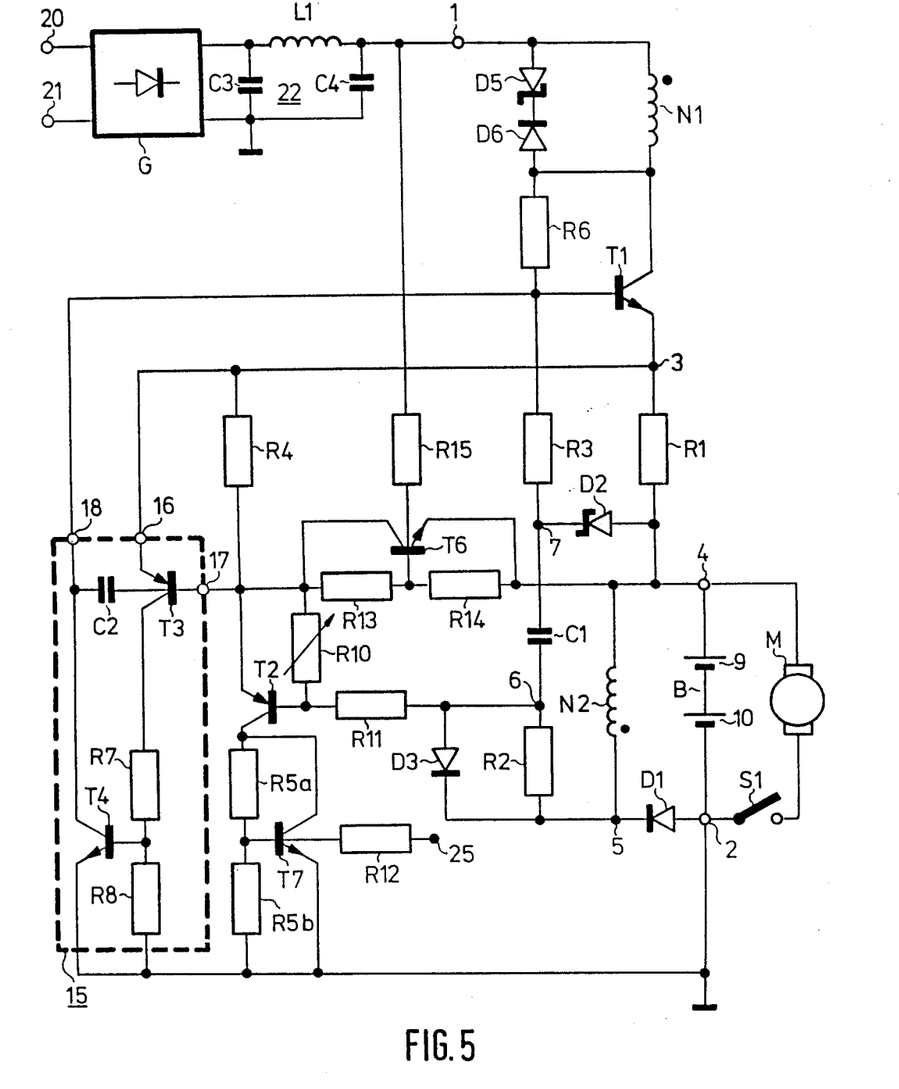
FIG. 5 shows a fourth embodiment of a power supply circuit in accordance with the invention.

FIG. 5 shows a fourth embodiment of a power supply circuit in accordance with the invention, identical parts bearing the same reference numerals as in FIG. 4. In this embodiment the resistor R15 is not connected to the positive terminal of the secondary winding n2 during the forward interval, but it is connected to the positive terminal of the primary winding n1. It is to be noted that alternatively the resistor R15 may be connected to any other point in the circuit which is at a voltage proportional to the input voltage. In the present embodiment the node between the resistors R5a and R5b is, moreover, connected to the base of a transistor T7 having its emitter connected to that end of the resistor R5b which is remote from the base and having its collector connected to that end of the resistor R5a which is remote from the base. Moreover, the base of the transistor T7 is connected to the control input 25 by the resistor R12. When the transistor T2 is conductive, the voltage produced across the resistor, R5b is higher than the threshold voltage of the transistor T7, so that the transistor T7 will conduct. The collector-emitter voltage of the transistor T7 is then fixed at a value equal to the product of the base emitter voltage of the transistor T7 and a factor determined by the resistance values of the resistors R5a and R5b. The difference between the battery voltage and the voltage across the transistor T7 appears across the resistor R4 and determines whether a change over to trickle charging is to be effected. By connecting the terminal 25 to the emitter of the transistor T7, the resistors T5b and R12 are arranged in parallel. When the value of the resistor R12 is suitably selected relative to that of the resistor R5b, the voltage across the transistor T7 is increased. This means that a smaller portion of the battery voltage will appear across the resistor R4 than in the case that the terminal 25 does not carry a signal. As a result of this the battery voltage at which the change-over to trickel-charging is effected will be higher than in the first-mentioned case.

The invention is not limited to the embodiments shown herein. Within the scope of the inventions a variety of modifications will be conceivable to those skilled in the art. For example, the first and the second transistor switches may alternatively comprise compound transistors or other semiconductor switching elements. Moreover, the first switching means may be constructed in another way than shown and the input voltage compensation means may also be constructed in another way than shown.

We claim:

1. A power-supply circuit for charging a battery with a charging current, said power-supply circuit comprising, between a first and a second power supply terminal, a first series arrangement of a primary winding of a transformer, a first transistor switch having a control input, and a first resistor, and a second series arrangement of a secondary winding of the transformer and a first diode, said second series arrangement comprising terminals for connecting a battery; a positive-feedback path between a node interconnecting the secondary winding and the first diode and the control input of the first transistor switch, said positive-feedback path comprising a series arrangement of a second resistor and a first capacitor, the terminal of the first capacitor which is remote from the second resistor being coupled to the cathode of a zener diode; first switching means for turning off the first transistor switch at a specific voltage across the first resistor, said first switching means comprising a first input coupled to that end of the first resistor which is nearest the first transistor switch, a second input coupled to that end of the first resistor remote from the first transistor switch, and an output which is coupled to the control input of the first transistor switch; and second switching means for changing over from the charging current to a trickle-charging current above a specific threshold voltage, characterized in that the anode of the zener diode is coupled to one end of the first resistor, and in that the second switching means comprises a series arrangement of a third resistor, a second transistor switch having a control input, and a fourth resistor, arranged between the first input of the first switching means and the second power supply terminal, the control input of the second transistor switch being coupled to the node between the second resistor and the first capacitor, a third diode being arranged in parallel with the second resistor.

2. A power-supply circuit as claimed in claim 1, characterized in that the circuit comprises a switch for connecting a motor in parallel with the battery.

3. A power-supply circuit as claimed in claim 1 or 2, characterized in that a series arrangement of a fifth and a sixth resistor is arranged between the second input of the first switching means and the node between the second resistor and the first capacitor, the control input of the second transistor switch being connected to the node between the fifth and the sixth resistor.

4. A power-supply circuit as claimed in claim 3, characterized in that the fifth resistor is a variable resistor.

5. A power-supply circuit as claimed in claim 3, characterized in that the second input of the first switching means is coupled to that end of the first resistor which is remote from the first transistor switch by means of a voltage source for supplying a reference voltage which decreases as the input voltage increases.

6. A power-supply circuit as claimed in claim 5, characterized in that the reference voltage source comprises the series arrangement of an eighth and a ninth resistor, whose interconnecting node, by means of a tenth resistor, is coupled to a voltage terminal arranged to carry a voltage proportional to the input voltage and coupled to the base of a fourth transistor, whose collector and emitter are coupled to those ends of the eighth and the ninth resistors, respectively, which are remote from the node.

7. A power-supply circuit as claimed in claim 6, characterized in that the voltage terminal is formed by the node between the secondary winding and the first diode.

8. A power-supply circuit as claimed in claim 6, characterized in that the voltage terminal is formed by the input terminal connected to the primary winding.

9. A power-supply circuit as claimed in claim 3, characterized in that the first switching means comprises a fifth transistor having its emitter connected to the first input, having its base connected to the second input, and having its collector connected to the second power-supply terminal by means of a series arrangement of an eleventh and a twelfth resistor, the node between the eleventh and the twelfth resistors being connected to the base of the sixth transistor, whose collector is coupled to the control input of the first transistor switch and, via a second capacitor, to the second input of the first switching means.

10. A power-supply circuit as claimed in claim 3, characterized in that the fourth resistor is formed by the series arrangement of two resistors, whose interconnecting node is coupled, via a seventh resistor, to a control input for receiving a control signal for increasing the voltage at which the change-over from the charging current to the trickle charging current is effected 11. A power-supply circuit as claimed in claim 10, characterized in that the second input of the first switching means is coupled to that end of the first resistor which is remote from the first transistor switch by means of a voltage source for supplying a reference voltage which decreases as the input voltage increases.

12. A power-supply circuit as claimed in claim 11, characterized in that the reference voltage source comprises the series arrangement of an eighth and a ninth resistor, whose interconnecting node, by means of a tenth resistor, is coupled to a voltage terminal arranged to carry a voltage proportional to the input voltage and coupled to the base of a fourth transistor, whose collector and emitter are coupled to those ends of the eighth and the ninth resistors, respectively, which are remote from the node.

13. A power-supply circuit as claimed in claim 12, characterized in that the voltage terminal is formed by the node between the secondary winding and the first diode.

14. A power-supply circuit as claimed in claim 12, characterized in that the voltage terminal is formed by the input terminal connected to the primary winding.

15. A power-supply circuit as claimed in claim 10, characterized in that the first switching means comprises a fifth transistor having its emitter connected to the first input, having its base connected to the second input, and having its collector connected to the second power-supply terminal by means of a series arrangement of an eleventh and a twelfth resistor, the node between the eleventh and the twelfth resistors being connected to the base of the sixth transistor, whose collector is coupled to the control input of the first transistor switch and, via a second capacitor, to the second input of the first switching means.

16. A power-supply circuit as claimed in claim 10, characterized in that, in order to increase the turn-off voltage, the seventh resistor is coupled to the positive terminal of the battery.

17. A power-supply circuit as claimed in claim 16, characterized in that the second input of the first switching means is coupled to that end of the first resistor which is remote from the first transistor switch by means of a voltage source for supplying a reference voltage which decreases as the input voltage increases.

18. A power-supply circuit as claimed in claim 17, characterized in that the reference voltage source comprises the series arrrangement of an eighth and a ninth resistor, whose interconnecting node, by means of a tenth resistor, is coupled to a voltage terminal arranged to carry a voltage proportional to the input voltage and coupled to the base of a fourth transistor, whose collector and emitter are coupled to those ends of the eighth and the ninth resistors, respectively, which are remote from the node.

19. A power-supply circuit as claimed in claim 18, characterized in that the voltage terminal is formed by the node between the secondary winding and the first diode.

20. A power-supply circuit as claimed in claim 18, characterized in that the voltage terminal is formed by the input terminal connected to the primary winding.

21. A power-supply circuit as claimed in claim 16, characterized in that the first switching means comprises a fifth transistor having its emitter connected to the first input, having its base connected to the second input, and having its collector connected to the second power-supply terminal by means of a series arrangement of an eleventh and a twelfth resistor, the node between the eleventh and the twelfth resistors being connected to the base of the sixth transistor, whose collector is coupled to the control input of the first transistor switch and, via a second capacitor, to the second input of the first switching means.

22. A power-supply circuit as claimed in claim 10, characterized in that the node between the two resistors is connected to the base of a third transistor, which has its collector and emitter coupled to those ends of the two resistors, which are remote from the node, and in that, in order to increase the turn-off voltage, the seventh resistor is coupled to the base of the third transistor.

23. A power-supply circuit as claimed in claim 22, characterized in that the second input of the first switching means is coupled to that end of the first resistor which is remote from the first transistor switch by means of a voltage source for supplying a reference voltage which decreases as the input voltage increases.

24. A power-supply circuit as claimed in claim 23, characterized in that the reference voltage source comprises the series arrangement of an eighth and a ninth resistdr, whose interconnecting node, by means of a tenth resistor, is coupled to a voltage terminal arranged to carry a voltage proportional to the input voltage and coupled to the base of a fourth transistor, whose collector and emitter are coupled to those ends of the eighth and the ninth resistors, respectively, which are remote from the node.

25. A power-supply circuit as claimed in claim 24, characterized in that the voltage terminal is formed by the node between the secondary winding and the first diode.

26. A power-supply circuit as claimed in claim 24, characterized in that the voltage terminal is formed by the input terminal connected to the primary winding.

27. A power-supply circuit as claimed in claim 22, characterized in that the first switching means comprises a fifth transistor having its emitter connected to the first input, having its base connected to the second input, and having its collector connected to the second power-supply terminal by means of a series arrangement of an eleventh and a twelfth resistor, the node between the eleventh and the twelfth resistors being connected to the base of the sixth transistor, whose collector is coupled to the control input of the first transistor switch and, via a second capacitor, to the second input of the first switching means.

28. A power-supply circuit as claimed in claim 1, characterized in that the second input of the first switching means is coupled to that end of the first resistor which is remote from the first transistor switch by means of a voltage source for supplying a reference voltage which decreases as the input voltage increases.

29. A power-supply circuit as claimed in claim 28, characterized in that the reference-voltage source comprises the series arrangement of an eighth and a ninth resistor, whose interconnecting node, by means of a tenth resistor, is coupled to a voltage terminal arranged to carry a voltage proportional to the input voltage and coupled to the base of a fourth transistor, whose collector and emitter are coupled to those ends of the eighth and the ninth resistors respectively, which are remote from the node.

30. A power-supply circuit as claimed in claim 29, characterized in that the voltage terminal is formed by the node between the secondary winding and the first diode.

31. A power-supply circuit as claimed in claim 29, characterized in that the voltage terminal is formed by the input terminal connected to the primary winding.

32. A power-supply circuit as claimed in claim 1, characterized in that the first switching means comprise a fifth transistor having its emitter connected to the first input, having its base connected to the second input, and having its collector connected to the second power-supply terminal by means of a series arrangement of an eleventh and a twelfth resistor, the node between the eleventh and the twelfth resistors being connected to the base of the sixth transistor, whose collector is coupled to the control input of the first transistor switch and, via a second capacitor, to the second input of the first switching means.

33. A power-supply circuit as claimed in claim 13, characterized in that a thirteenth resistor is arranged in series with the light-emitting diode.

34. A power-supply circuit as claimed in claim 1, characterized in that a light emitting-diode is arranged between the control input of the first transistor switch and the positive terminal of the battery.

35. A power-supply circuit as claimed in claim 1, characterized in that the first transistor switch comprises a transistor.

36. A power-supply circuit as claimed in claim 1, characterized in that the second transistor switch comprises a transistor.

* * * * *